United States Patent
Mizuno et al.

(10) Patent No.: US 7,669,031 B2
(45) Date of Patent: Feb. 23, 2010

(54) COMPUTER SYSTEM, STORAGE AREA ALLOCATION METHOD, AND MANAGEMENT COMPUTER

(75) Inventors: Jun Mizuno, Yokohama (JP); Takeshi Ishizaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 253 days.

(21) Appl. No.: 11/312,415

(22) Filed: Dec. 21, 2005

(65) Prior Publication Data

US 2007/0094395 A1    Apr. 26, 2007

(30) Foreign Application Priority Data

Oct. 26, 2005    (JP) .............................. 2005-311676

(51) Int. Cl.
   *G06F 13/12* (2006.01)
(52) U.S. Cl. ....................... 711/173; 711/111; 711/112
(58) Field of Classification Search ................. 711/111, 711/112, 173
   See application file for complete search history.

(56) References Cited

U.S. PATENT DOCUMENTS 5,129,088 A * 7/1992 Auslander et al. .............. 711/1
2003/0009619 A1 * 1/2003 Kano et al. ................... 711/112

* cited by examiner

*Primary Examiner*—Reginald G Bragdon
*Assistant Examiner*—Kenneth M Lo
(74) *Attorney, Agent, or Firm*—Brundidge & Stanger, P.C.

(57) ABSTRACT

Disclosed is to prevent deterioration in I/O performance of a computer resulted from a use of the same physical disk among different logical volumes. A volume management server 1010 groups together logical volumes which use the same physical disk of a storage device 1020 as a volume group and allocates a storage area on the physical disk to be used on a priority basis by this volume group to the volume group, and thereby a physical arrangement according to a present physical arrangement of the logical volume can be performed when an automatic expansion of the logical volume is performed thereafter so that the I/O performance deterioration of the computer caused by a mutual interference is avoided at the time of access from the computer 1030 to the storage device 1020.

7 Claims, 13 Drawing Sheets

FIG. 11

Volume Allocation management 3110

| Volume ID | Segment ID | LBA Start | LBA End | Allocated Storage Area ID |
|---|---|---|---|---|
| Vol1 | Seg1 | 0000 | 0099 | 1 |
| Vol1 | Seg2 | 0100 | 0199 | 13 |
| Vol1 | ... | ... | ... | ... |
| Vol1 | Seg100 | 9900 | 9999 | 5 |
| Vol2 | Seg1 | 0000 | 0099 | 11 |
| Vol2 | Seg2 | 0100 | 0199 | |
| Vol2 | ... | ... | ... | ... |
| Vol2 | Seg100 | 9900 | 9999 | 7 |
| Vol3 | Seg1 | 0000 | 0099 | 20 |
| Vol3 | Seg2 | 0100 | 0199 | 9 |
| Vol3 | ... | ... | ... | ... |
| Vol3 | Seg100 | 9900 | 9999 | |

FIG. 12

Physical Disk Allocation management Table 3120

| Physical Disk ID | Storage Area ID | Remaining Capacity |
|---|---|---|
| RG1 | 1, 5, 10, 13, 19 | 0GB |
| RG2 | 4, 6, 8, 12, 14 | 100GB |
| RG3 | 3, 7, 9, 11, 15 | 40GB |
| RG4 | 2, 16, 17, 18, 20 | 60GB |

FIG. 13

Priority Allocation management Table ~ 3130

| Volume ID | Priority Allocation Storage Area ID |
|---|---|
| Vol1 | 1, 5, 10, 13, 19 |
| Vol2 | 7, 11, 17 |
| Vol3 | 9, 20 |
| ... | ... |

Volume management Table ~ 2210

| Volume ID | Allocated Storage Area ID | Allocated Physical Disk ID | Volume Group ID |
|---|---|---|---|
| Vol1 | 1, 5, 10, 13, 19 | RG1 | Group1 |
| Vol2 | 7, 11, 17 | RG3, RG4 | Group2 |
| Vol3 | 9, 20 | RG3, RG4 | Group2 |
| ... | ... | ... | ... |

14010, 14020, 14030, 14040

| Priority Allocation Physical Disk ID | Priority Allocation Storage Area ID |
|---|---|
| RG1, RG2 | 4, 6, 8, 12, 14 |
| RG3, RG4 | 2, 3, 16 |
| RG3, RG4 | 15, 18 |
| ... | ... |

Physical Disk management Table ~2220

| Physical Disk ID (15010) | Storage Area ID (15020) | Remaining Capacity (15030) | Allocation Volume Group ID (15040) |
|---|---|---|---|
| RG1 | 1, 5, 10, 13, 19 | 0GB | Group1 |
| RG2 | 4, 6, 8, 12, 14 | 100GB | Group1 |
| RG3 | 3, 7, 9, 11, 15 | 40GB | Group2 |
| RG4 | 2, 16, 17, 18, 20 | 60GB | Group2 |
| ... | ... | ... | ... |

FIG. 16

Volume Group management Table ~2230

| Volume Group ID (16010) | Volume ID (16020) | Physical Disk ID (16030) |
|---|---|---|
| Group1 | Vol1 | RG1 |
| Group2 | Vol2, Vol3 | RG2, RG3 |
| ... | ... | ... |

Priority Allocation Storage Area Information — 17000

| Volume ID | Priority Allocation Storage Area ID |
|---|---|
| Vol1 | 4, 6, 8, 12, 14 |
| Vol2 | 2, 3, 16 |
| Vol3 | 15, 18 |
| ... | ... |

COMPUTER SYSTEM, STORAGE AREA ALLOCATION METHOD, AND MANAGEMENT COMPUTER

CROSS REFERENCES TO RELATED APPLICATIONS

The present invention contains subject matter related to Japanese Patent Application JP 2005-311676 filed in the Japanese Patent Office on Oct. 26, 2005, the entire contents of which being incorporated herein by reference.

BACKGROUND

The present invention relates to a storage system used for a computer system, and more particularly the present invention relates to a method of expanding a volume capacity at the time of writing into a storage system from a computer system.

Generally, a computer system is comprised of a computer that performs each individual job and a storage device that reads and writes data in accordance with a command of the computer. The storage device has a plurality of physical disks to store and read out data, and manages the physical disks by dividing into a plurality of storage areas.

Accordingly, the storage device can provide the storage area to the computer in a form of a logical volume. This logical volume is comprised of a plurality of segments and is a unit of a logical storage capacity that makes it possible to read and write data in accordance with the command of the computer by allocating the storage area on the physical disk to each segment. The capacity of this logical volume can be expanded at any time according to a necessity.

For example, when the computer uses up the logical volume provided by the storage device, the computer can expand the logical volume capacity by creating a logical volume from an unused storage area of a physical disk in the storage device and by combining this logical volume with the logical volume in use. Such a method is called on-line volume expansion.

However, in this on-line volume expansion, an administrator of the storage device needs to perform a series of operations until the volume expansion is completed. Therefore, when a sudden increase of the capacity occurs in computer systems of a plurality of enterprises in such a large scale data center that the plurality of enterprises use simultaneously, there occurs a possibility that requests for on-line volume expansion are generated simultaneously such that the administrator of the storage device is not able to cope with. In the worst case, there has been such a problem that it was not possible to perform the on-line volume expansion and processing of the computer stopped.

Then, in order to solve a request of a user and administrator of a storage system, the patent reference 1, for example, discloses such a method that a storage device creates a storage area from an unused area in a physical disk while a computer is on-line and adds dynamically to a segment of a logical volume during on-line access when a capacity of the logical volume in the storage device becomes insufficient due to writing from the computer. Such method is called a volume capacity automatic expansion.

This volume capacity automatic expansion is to make an allocation of an unallocated area of a physical disk to a logical volume when there is a request for writing from a computer. The on-line volume expansion can be automatically performed without an intervention of an administrator of a storage device by this volume capacity automatic expansion.

[Patent Reference 1] Japanese Patent Application Publication No. 2003-15915

SUMMARY

However, in the above-described prior art, it is practiced that the storage device creates the storage area from the unused area in the physical disk while the computer is on-line and adds dynamically to the storage area of the logical volume during the on-line access when the capacity of the logical volume in the storage device becomes insufficient due to the writing into the logical volume from the computer.

At this time, the allocation is made sequentially from an empty area without taking it into consideration that a storage area created from an unused area of which physical disk should be added to the storage area of the logical volume. Accordingly, physical disks used by the same logical volume are dispersed and there is such an inconvenience that deterioration in I/O performance of the computer occurs due to a mutual interference resulted from a use of the same physical disk among different logical volumes.

Then, the present invention aims at preventing deterioration in I/O performance of a computer by preventing generation of a mutual interference among different logical volumes when the volume capacity automatic expansion of a logical volume is performed.

In order to solve the above-described problem and achieve the aim of the present invention, a computer system of the present invention is a computer system that includes a plurality of host computers, a plurality of storage systems, and a management computer, wherein the above-described management computer has a processor, and this processor executes an information collection program to acquire volume allocation information and physical disk information which are retained in the above-described storage system; and a storage area allocation program to set priority allocation storage area information in which an allocation area is limited depending on an existence or nonexistence of an already allocated area based on the above-described volume allocation information and above-described physical disk information when an storage area of a physical disk is allocated to a logical volume of the above-described storage system.

In addition, a storage area allocation method of the present invention is a storage area allocation method in a computer system which includes a plurality of host computers, a plurality of storage systems, and a management computer, wherein the above-described management computer is used in order to acquire volume allocation information and physical disk information which are retained in the above-described storage system by using an information collection program and to set priority allocation storage area information in which an allocation area is limited depending on an existence or nonexistence of an already allocated area based on the above-described volume allocation information and above-described physical disk information by using a storage area allocation program when a storage area of a physical disk is allocated to a logical volume of the above-described storage system.

Also, a management computer of the present invention is a management computer to control a plurality of storage systems that store data used by a plurality of host computers on a plurality of volumes, wherein a memory; a hard disk; a processor to perform control; an input device to give the above-described storage system a command to set a priority allocation storage area; an output device to notify a completion of setting the priority allocation storage area from the above-described storage system; and a communication port to perform communication of management data with the above-described storage system are equipped, a management table that is generated based on volume allocation information and physical disk information which are retained in the above-described storage system; an information collection program to collect information from the above-described storage system; a storage area allocation program to allocate a storage area of a physical disk to a logical volume of the above-described storage system; and an information transmission program to transmit storage area allocation information of the above-described allocation to the above-described storage system are stored and provided in the above-described hard disk, and the control is performed such that the above-described information collection program acquires the volume allocation information and physical disk information which are retained in the above-described storage system and that the above-described storage area allocation program sets priority allocation storage area information in which an allocation area is limited depending on an existence or nonexistence of an already allocated area based on the above-described volume allocation information and above-described physical disk information when a storage area of a physical disk is allocated to a logical volume of the above-described storage system.

According to the present invention, the automatic expansion of the logical volume can be performed in consideration of the physical disk that includes the storage area to be allocated by setting the priority allocation storage area information in which the allocation area is limited depending on the existence or nonexistence of the already allocated area and by determining beforehand the storage area on the physical disk which is allocated on a priority basis to the logical volume even when the volume capacity automatic expansion of the logical volume is performed, and it is possible to prevent the generation of the mutual interference among the different logical volumes and to prevent the deterioration of the I/O performance of the computer.

In addition, logical volumes which use the same physical disk are grouped together as a volume group, a storage area on a physical disk which is used on a priority basis by this volume group is allocated to the volume group, and thereby a physical arrangement according to a present physical arrangement of the logical volume can be performed in such a manner that an already allocated volume group remains as is allocated; another volume group is allocated separately; and a volume group which can share the same physical disk is allocated on a priority basis, for example, when an automatic expansion of a logical volume is performed thereafter.

BRIEF DESCRIPTION OF THE DRAWINGS

FIG. 11 is a diagram showing a volume allocation management table that is retained in the storage device;

FIG. 12 is a diagram showing a physical disk allocation management table that is retained in the storage device;

FIG. 13 is a diagram showing a priority allocation management table that is retained in the storage device;

FIG. 14 is a diagram showing a volume management table that is retained in the volume management server;

FIG. 15 is a diagram showing a physical disk management table that is retained in the volume management server;

FIG. 16 is a diagram showing a volume group management table that is retained in the volume group management server;

DESCRIPTION OF THE PREFERRED EMBODIMENTS

Hereinafter, embodiments of the present invention are explained more specifically by referring to the accompanied drawings when appropriate.

Figure 1:
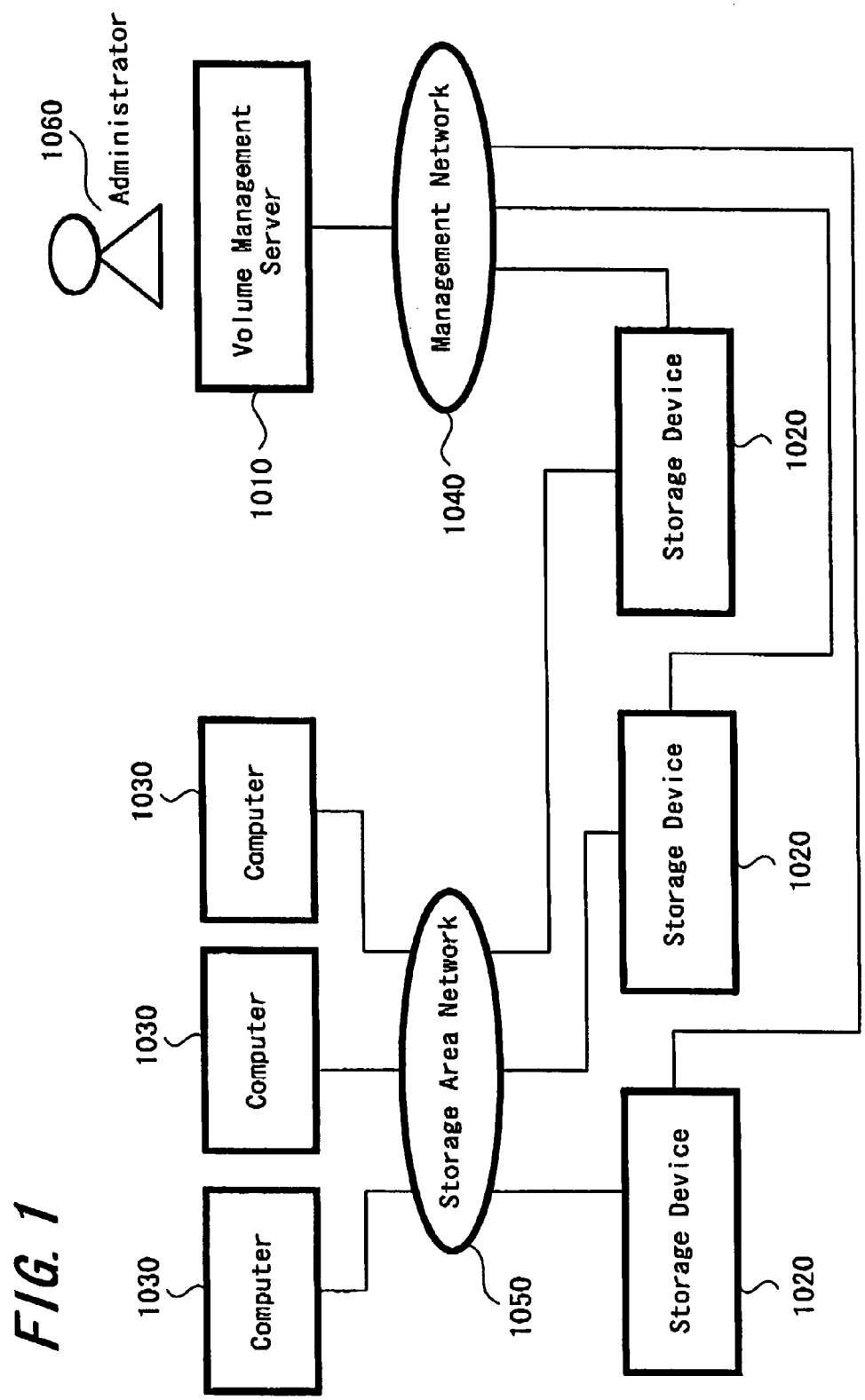
FIG. 1 is a diagram showing an example of an outline configuration of a storage management system.

FIG. 1 is an outline diagram of a storage management system which is applied to an embodiment of the present invention. As shown in this figure, the storage management system of the present embodiment is comprised of a volume management server 1010, a plurality of computers 1030, and a plurality of storage devices 1020.

An administrator 1060 gives the volume management server 1010 a command to set a priority allocation storage area by taking an opportunity of an optimization completion of a logical volume in the storage device 1020, an addition of a physical disk, and the like.

Although the volume management server 1010 is connected with the storage device 1020 through a management network 1040 and the computer 1030 is connected with the storage device 1020 through a storage area network 1050 in the present embodiment, the management network 1040 and storage area network 1050 may be the same network.

Figure 2:
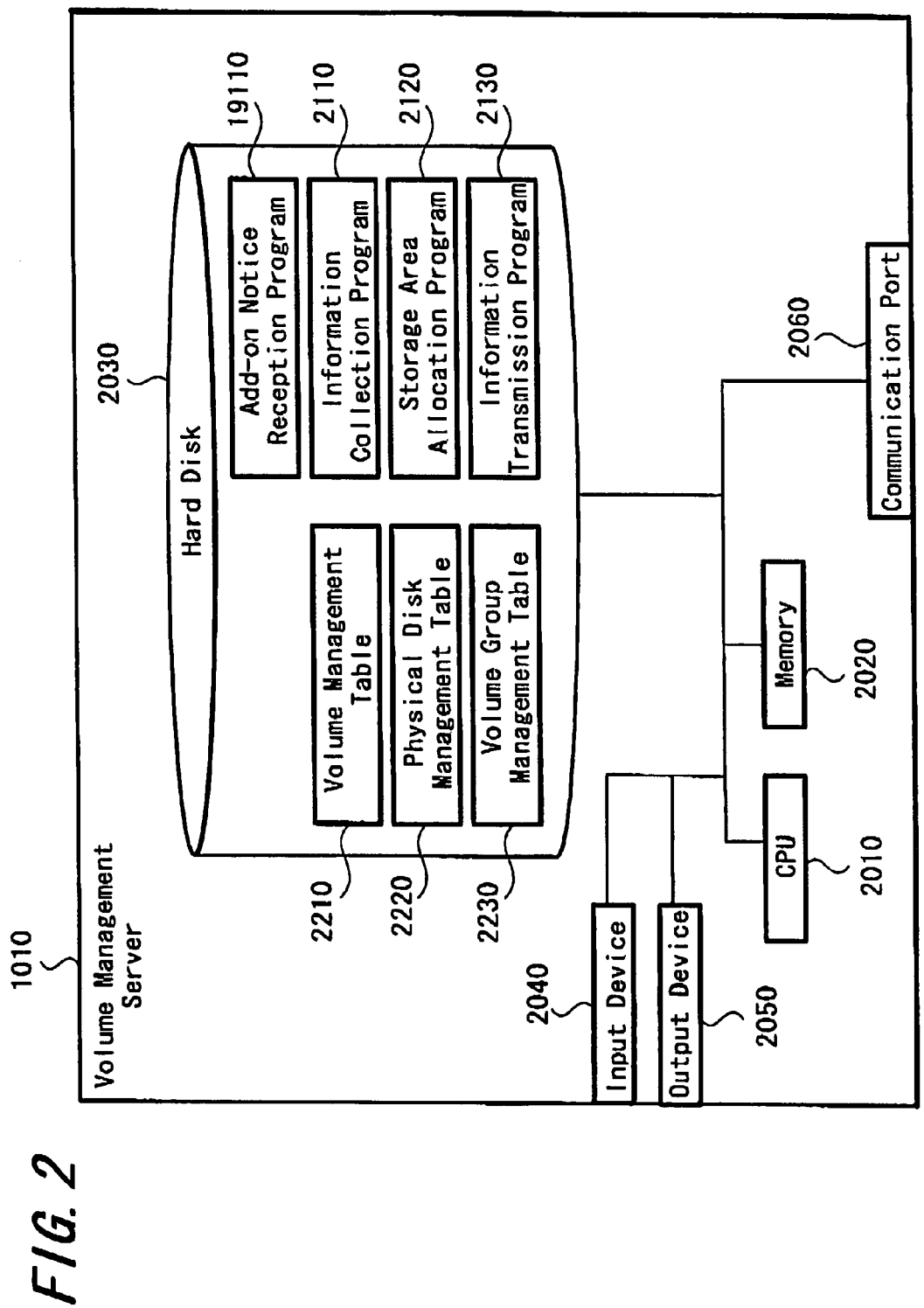
FIG. 2 is a diagram showing a configuration of a volume management server.

FIG. 2 is a diagram showing a configuration of the volume management server 1010.

The volume management server 1010 is comprised of a CPU 2010, a memory 2020, a hard disk 2030, an input device 2040 for the administrator 1060 to input a command to set a priority allocation storage area, an output device 2050 to notify the administrator 1060 that the setting of the priority allocation storage area is completed, and a communication port 2060 which is an interface to communicate management data with the storage device 1020.

Three programs which are an information collection program 2110 to collect volume allocation information and physical disk information form the storage device 1020, a storage area allocation program 2120 to generate priority allocation storage area information 17000 from the collected volume allocation information and physical disk information, and an information transmission program 2130 to transmit the priority allocation storage area information 17000 to the storage device 1020 are provided in the hard disk 2030.

In addition, a volume management table 2210 to manage a volume on the storage device 1020, a physical disk management table 2220 to manage a physical disk 3030 on the storage device 1020, and a volume group management table 2230 to manage information of a grouped volume on the storage device 1020 are included in the hard disk 2030.

When the command to set the priority allocation storage area is received from the administrator 1060, the volume management server 1010 having such configuration transmits the priority allocation storage area information 17000 to the storage device 1020 after acquiring the volume allocation information and physical disk information from the storage device 1020 and producing the priority allocation storage area information 17000 shown in FIG. 17 which is described later.

Figure 3:
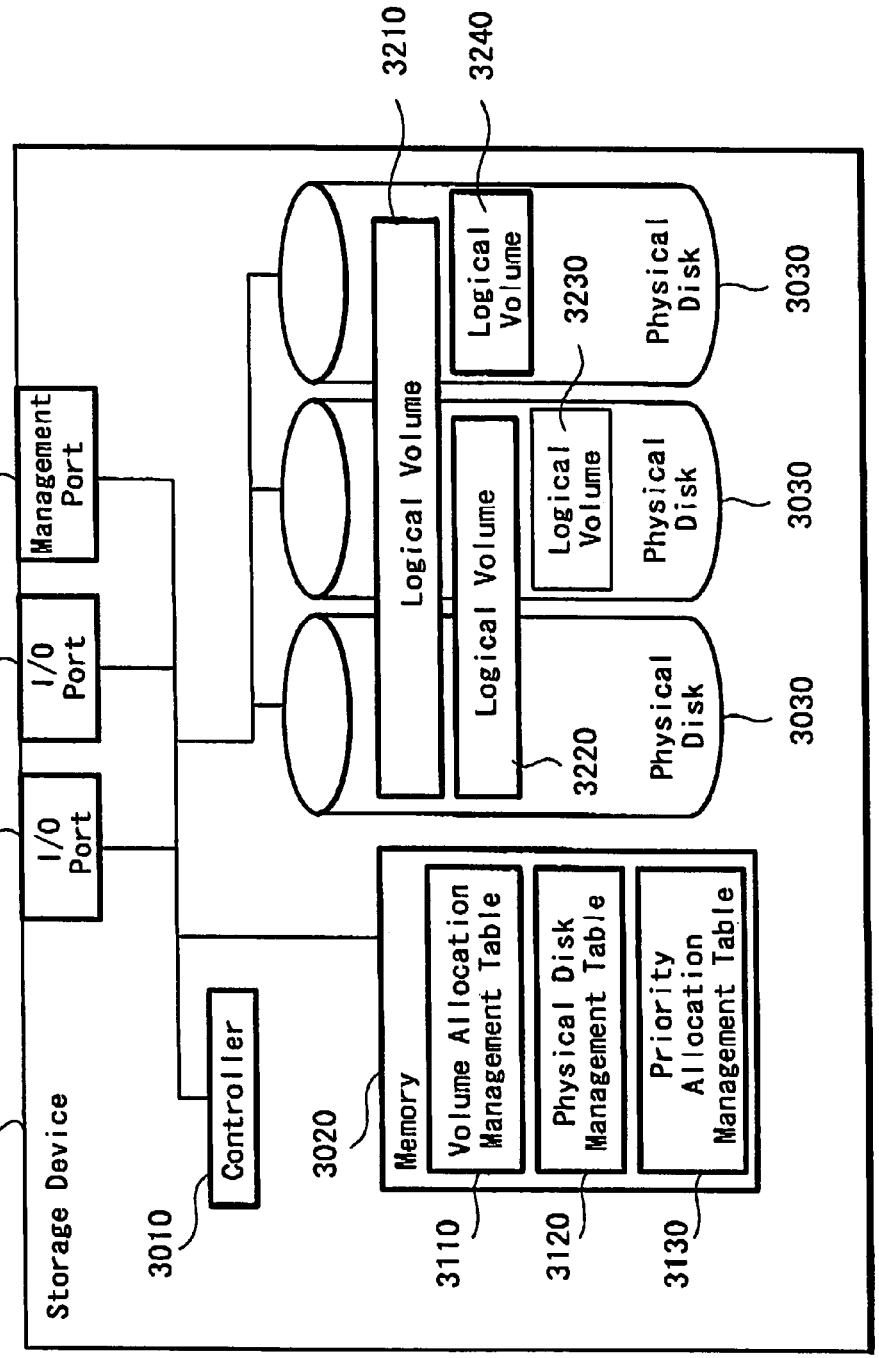
FIG. 3 is a diagram showing a configuration of a storage device.

FIG. 3 is a diagram showing a configuration of the storage device 1020. The storage device 1020 is comprised of an I/O port 3040 which is an interface used for communication with the computer 1030, a management port 3050 which is an interface used for communication of management data, a plurality of physical disks 3030, a controller 3010 which controls the storage device 1020, and a memory 3020. The plurality of physical disks 3030 are allocated to different logical volumes 3210, 3220, 3230, and 3240.

A volume allocation management table 3110 to manage volume allocation information of the storage device 1020, which is shown in later-described FIG. 11, a physical disk allocation management table 3120 to manage the physical disk 3030 of the storage device 1020, which is shown in later-described FIG. 12, a priority allocation management table 3130 to manage a physical volume to allocate on a priority basis to a logical volume, which is shown in later-described FIG. 13, are included in the memory 3020.

The volume allocation management table 3110 shown in FIG. 11 is comprised of a volume ID 11010 to identify a logical volume, a segment ID 11020 to identify a segment in the logical volume, an LBA start 11030 to show an LBA start address of the segment in the logical volume, an LBA end address 11040 to show an LBA end address of the segment in the logical volume, and an allocated storage area ID 11050 to identify a storage area allocated to the segment in the volume.

The physical disk allocation management table 3120 shown in FIG. 12 is comprised of a physical disk ID 12010 to identify a physical disk 3030, a storage area ID 12020 to identify a storage area included in the physical disk 3030, and a remaining capacity 12030 in the physical disk 3030.

The priority allocation management table 3130 shown in FIG. 13 is comprised of a volume ID 13010 and a priority allocation storage area ID 13020 to identify a storage area allocated on a priority basis to the volume.

When a request for writing into a logical volume is received through the I/O port 3040, the storage device 1020 confirms whether a storage area is allocated to an address of the corresponding logical volume.

When a storage area is not allocated to this address of the logical volume, contents of the request for writing is written after an unused storage area among storage areas allocated on a priority basis to the corresponding logical volume in the priority allocation management table 3130 shown in FIG. 13 is allocated to the logical volume. When a storage area is allocated to this address of the logical volume, the contents of the request for writing is written.

When the storage device 1020 receives a request for volume allocation information through the management port 3050, information included in the volume allocation management table 3110 that is retained in the memory 3020 is transmitted to a transmission source of the request for the volume allocation information as the volume allocation information.

In addition, when the storage device 1020 receives a request for physical disk information through the management port 3050, information included in the physical disk allocation management table 3120 that is retained in the memory 3020 is transmitted to a transmission source of the request for the physical disk information as the physical disk information.

Moreover, when the storage device 1020 receives the priority allocation storage area information 17000 through the management port 3050, the priority allocation management table 3130 retained in the memory 3020 is renewed with the contents of the received priority allocation storage area information 17000.

Although an example in which the volume management server 1010 and the storage device 1020 operate in different devices is shown in the present embodiment, the present invention is not limited to this embodiment and it is possible to configure such that each program to execute processing performed in the volume management server 1010 is retained in the memory 3020 of the storage device 1020.

Hereinafter, an explanation is made to an operation of the volume management server 1010 in the present embodiment.

Figure 4:
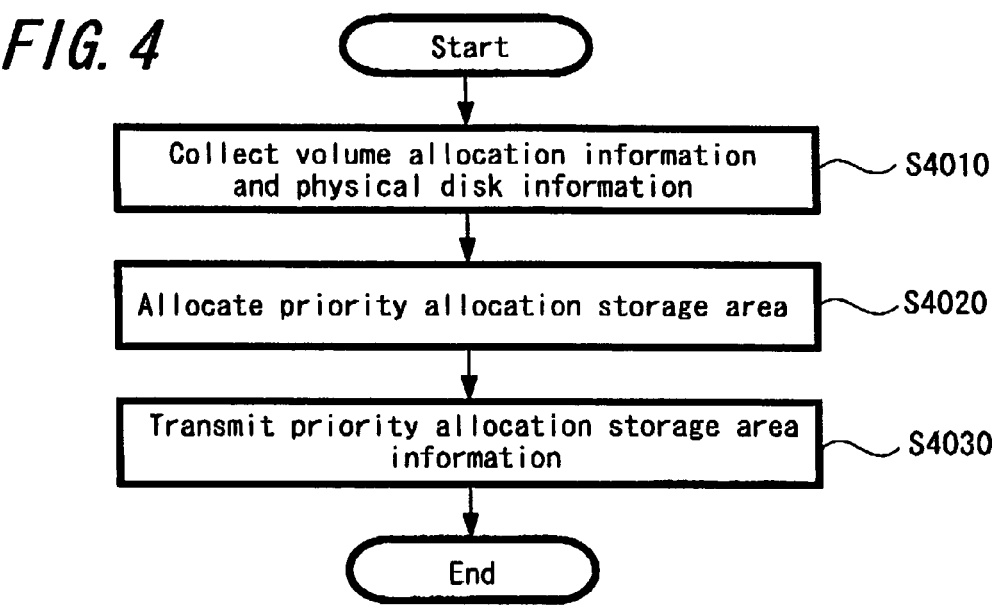
FIG. 4 is a flow chart showing processing in the volume management server.

FIG. 4 is a flow chart showing an outline of processing in the volume management server 1010.

First, the volume management server 1010 collects volume allocation information and physical disk information from the storage device 1020 by using the information collection program 2110 (step S4010).

More precisely, the CPU 2010 of the volume management server 1010 collects each information of the volume allocation management table 3110 shown in FIG. 11 and physical disk allocation management table 3120 shown in FIG. 12 by reading out the information collection program 2110 and executing processing of an information collection module.

Next, information collection processing (step S4010) in the information collection program 2110 is explained.

First, an explanation is made to each table which is generated by this information collection program 2110.

The volume management table 2210 shown in FIG. 14 is comprised of a volume ID 14010, an allocated storage area ID 14020, an allocated physical disk ID 14030 to identify a physical disk which is allocated to a logical volume, a volume group ID 14040 to identify a volume group to which the logical volume belongs, a priority allocation physical disk ID 14050 to identify a physical disk which includes a storage area to allocate on a priority basis to the logical volume, a priority allocation storage area ID 14060 to identify the storage area to allocate on the priority basis to the logical volume.

The physical disk management table 2220 shown in FIG. 15 is comprised of a physical disk ID 15010, a storage area ID 15020, a remaining capacity 15030, and an allocation volume group ID 15040 to identify a volume group to allocate a physical disk.

Figure 5:
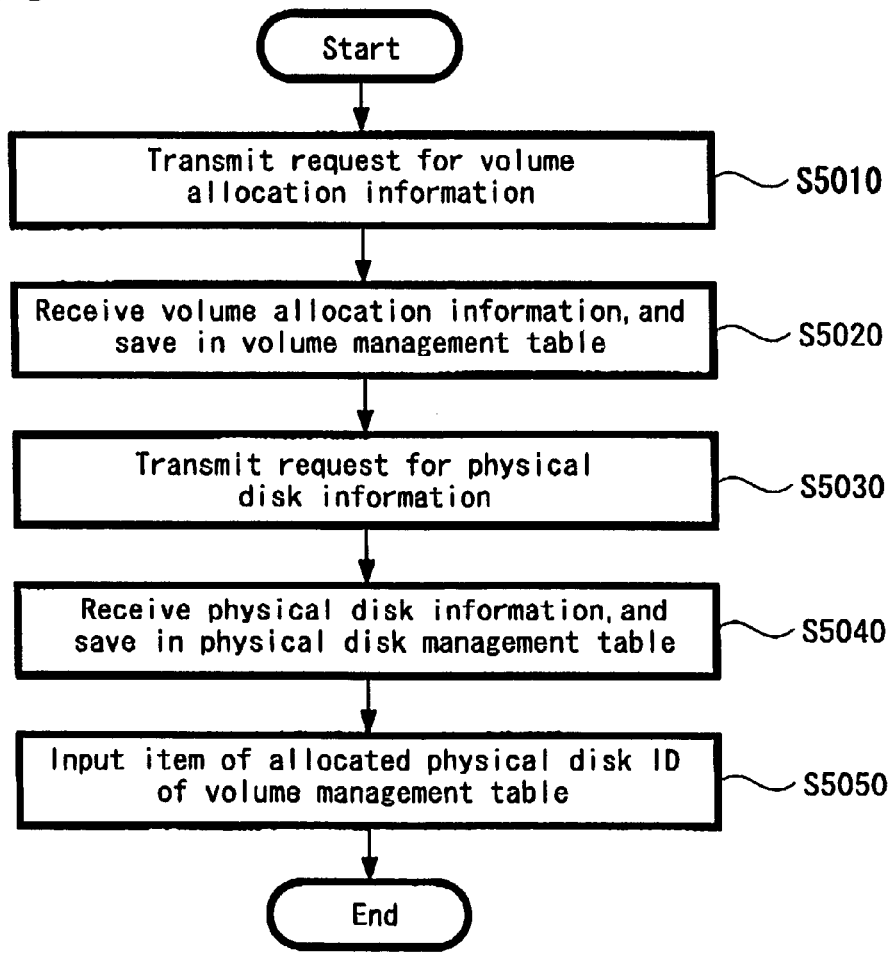
FIG. 5 is a flow chart showing processing in an information collection program of the volume management server.

FIG. 5 is a flow chart showing an outline of processing in the information collection program 2110.

First, the information collection program 2110 transmits a request for volume allocation information to the storage device 1020 (step S5010).

Next, the information collection program 2110 receives volume allocation information that is a response from the storage device 1020, and saves this information in the volume management table 2210 shown in FIG. 14 (step S5020).

Here, the information collection program 2110 adds a volume ID to the volume ID of the volume management table 2210 when this volume ID of the volume allocation information does not exist in the volume ID of the volume management table 2210, and executes nothing when this volume ID exists therein.

In addition, the information collection program 2110 adds an allocated storage area ID of the volume allocation information to a record having identical volume ID in the volume management table 2210 by setting a delimitation using a comma.

Furthermore, as to the other information included in the volume allocation information, the information collection program 2110 does not save that information in the volume management table 2210.

Next, the information collection program 2110 transmits a request for physical disk information to the storage device 1020 (step S5030).

Subsequently, the information collection program 2110 receives physical disk information that is a response from the storage device 1020, and saves this information in the physical disk management table 2220 shown in FIG. 15 (step S5040).

Here, the information collection program 2110 saves a physical disk ID of the physical disk information in the physical disk ID of the physical disk management table 2220.

In addition, the information collection program 2110 saves a storage area ID of the physical disk information in a storage area ID of a record having the identical physical disk ID in the physical disk management table 2220.

Furthermore, the information collection program 2110 saves a remaining capacity of the physical disk information in the remaining capacity of the record having the identical physical disk ID in the physical disk management table 2220.

Next, the information collection program 2110 inputs an item of the allocated physical disk of the volume management table 2210 (step S5050).

Figure 6:
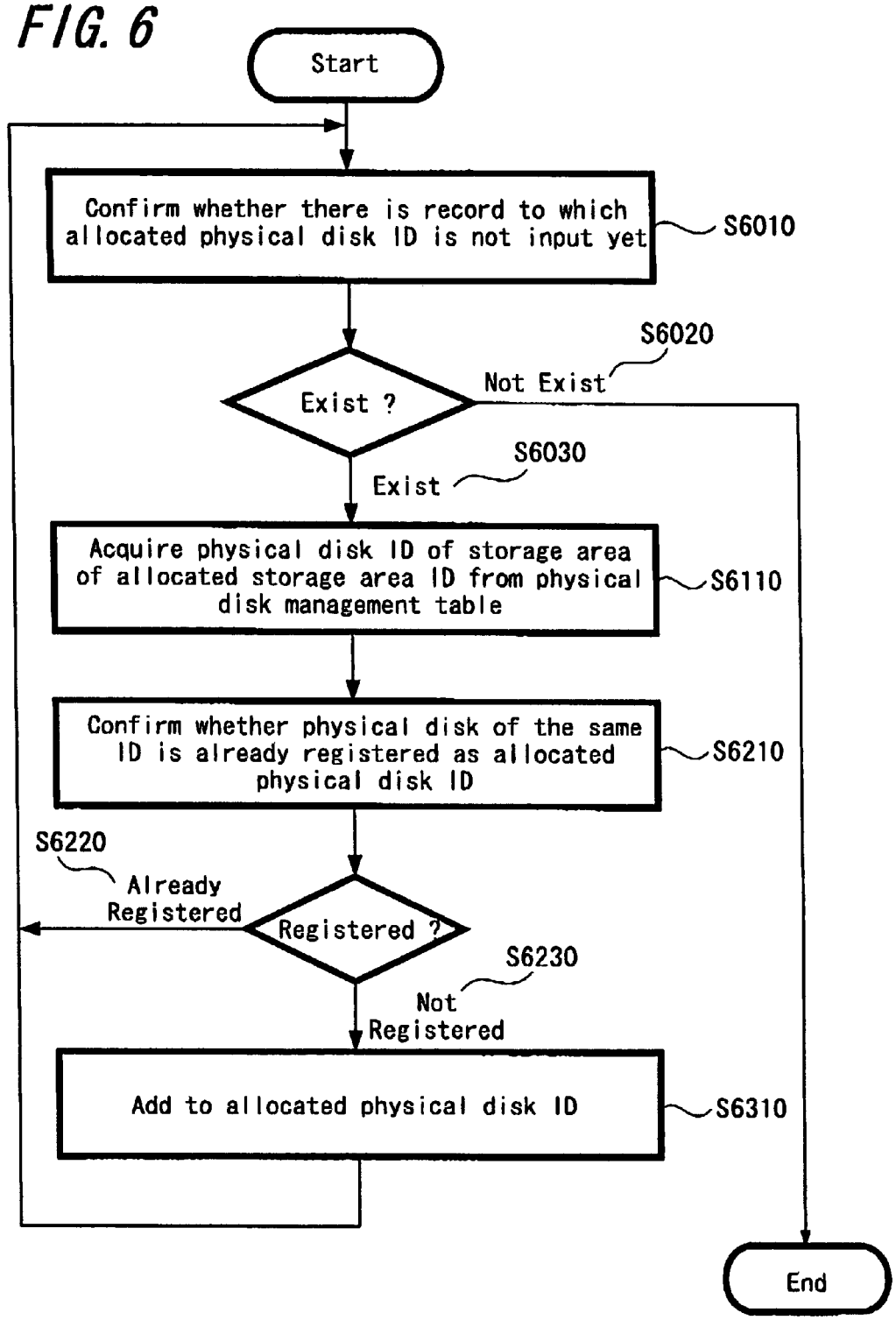
FIG. 6 is a flow chart showing processing to input an item of an already allocated physical disk of a volume management table by the information collection program of the volume management server.

FIG. 6 is a flow chart showing an outline of processing (step S5050) in which the information collection program 2110 inputs the item of the allocated physical disk of the volume management table 2210 shown in FIG. 14.

First, the information collection program 2110 confirms whether there is a logical volume to which the allocated physical disk ID is not input yet in the volume management table 2210 shown in FIG. 14 (step S6010).

When it is judged that there is no record in the volume management table 2210 to which the allocated physical disk ID is not input yet (step S6020), the information collection program 2110 ends the processing to input the item of the allocated physical disk of the volume management table 2210.

When it is judged that there is a record in the volume management table 2110 to which the allocated physical disk ID is not input yet (step S6030), a physical disk ID of a storage area that has the identical allocated storage area ID is acquired from the physical disk management table 2220 (step S6110).

Next, it is confirmed whether the acquired physical disk ID is already written in the allocated physical disk ID of a corresponding record of the volume management table 2110 (step S6210).

When it is judged that this physical disk ID is already registered (step S6220), the process returns to the processing (step S6010) to confirm whether there is a record to which the allocated physical disk ID is not input yet.

When it is judged that this physical disk ID is not registered (step S6230), the acquired physical disk ID is added to the allocated physical disk ID of this record of the volume management table 2210 (step S6310), and the process returns to the processing (step S6010) to confirm whether there is a record to which the allocated physical disk ID is not input yet.

The above is an explanation of the processing in which the information collection program 2110 inputs the item of the allocated physical disk of the volume management table 2210 shown in FIG. 14.

Returning to FIG. 4, the volume management server 1010 allocates a priority allocation storage area by using the storage area allocation program 2120 (step S4020).

More precisely, the CPU 2010 of the volume management server 1010 executes the allocation processing by reading out the storage area allocation program 2120 and executing processing of the storage area allocation module.

Figure 7:
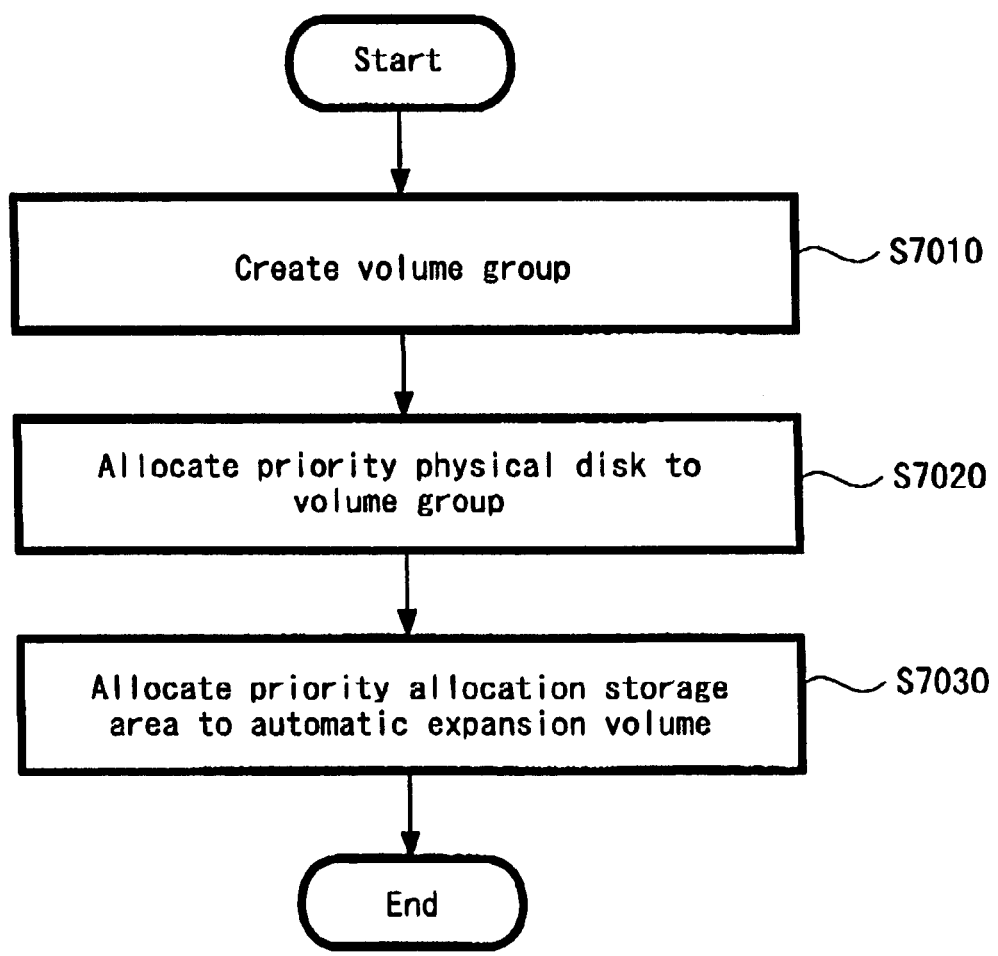
FIG. 7 is a flow chart showing processing of a storage area allocation program of the volume management server.

FIG. 7 is a flow chart showing an outline of the allocation processing (step S4020) of the priority allocation storage area of the storage area allocation program 2120.

First, the storage area allocation program 2120 creates a volume group (step S7010).

Figure 8:
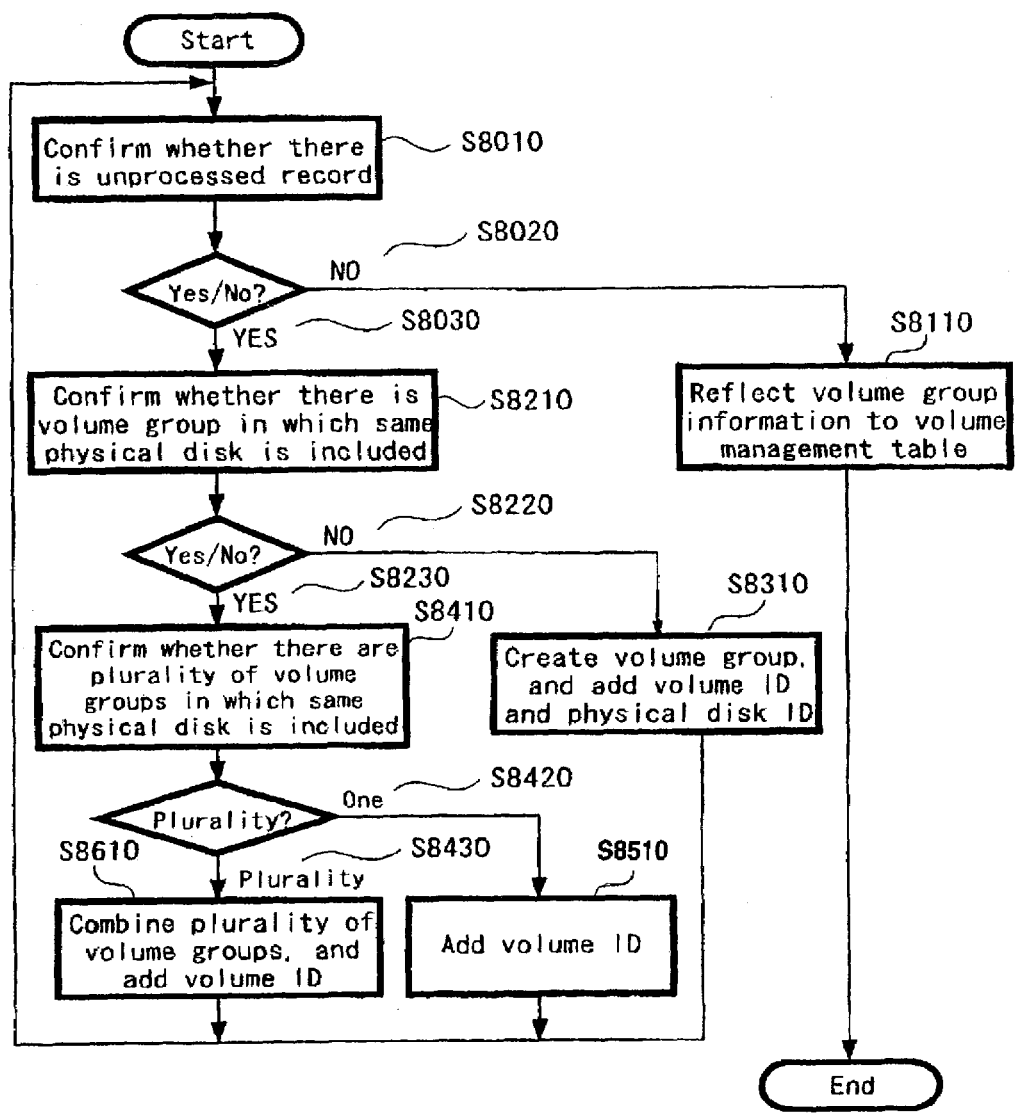
FIG. 8 is a flow chart showing processing to create a volume group by the storage area allocation program of the volume management server.

FIG. 8 is a flow chart showing an outline of the processing (step S7010) to create the volume group in the storage area allocation program 2120.

First, a table generated by the storage area allocation program 2120 is explained.

The volume group management table 2230 shown in FIG. 16 is comprised of a volume group ID 16010 to identify a volume group, a volume ID 16020 to identify a volume which is included in the volume group, and a physical disk ID 16030 to identify a physical disk which is allocated to the volume group.

Returning to an explanation of FIG. 8, first the storage area allocation program 2120 confirms whether there is an unprocessed record in the volume management table 2210 (step S8010).

When it is judged that there is no unprocessed record (step S8020), the storage area allocation program 2120 searches for a record which includes the volume ID of the volume management table 2210 from the volume group management table 2230 shown in FIG. 16, inputs a volume group ID of this record into the volume group ID of the volume management table 2210 (step S8110), and ends the processing to create the volume group.

When it is judged that there is an unprocessed record (step S8030), it is confirmed whether a record that includes the allocated physical disk ID of this record of the volume management table 2210 in an item of the physical disk ID exists in the volume group management table 2230 (step S8210).

When it is judged that the record that includes the allocated physical disk ID of this record of the volume management table 2210 in the item of the physical disk ID does not exist in the volume management table 2230 (step S8220), a volume group ID that does not exist in the volume group management table 2230 is created.

Then, a new record whose volume group ID is the newly created volume group ID described in the above and whose physical disk ID is the allocated physical disk ID of this record of the volume management table 2210 is added to the volume group management table 2230 (step S8310), and the process returns to the processing (step S8010) to confirm whether there is an unprocessed record in the volume management table 2210.

At this time, as a method of creating the volume group ID, there is a method of making one by adding 1 to the maximum integer number among integer numbers in use in case that a new addition is made by allocating an integer number to the volume group ID, for example.

When it is judged that a record that includes the allocated physical disk ID of this record of the volume management table 2210 in the item of the physical disk ID exists in the volume group management table 230 (step S8230), it is confirmed whether the physical disk ID that is included in the item of the allocated physical disk ID of this record of the volume management table 2210 is distributed over a plurality of records in the physical disk ID of the volume group management table 2230 (step S8410).

When it is judged that there is only one volume group in which the same physical disk ID is included (step S8420), the volume ID of this record of the volume management table 2210 is added to the volume ID of the record of the corresponding volume group ID among the records included in the volume management table 2230 (step S8510), and the process returns to the processing (step S8010) to confirm whether there is an unprocessed record in the volume management table 2210.

When it is judged that there are a plurality of volume groups in which the same physical disk ID is included (step S8430), a volume group ID that does not exist in the volume group management table 2230 is created. Further, a new record whose volume group ID is the newly created volume group ID described in the above and which includes all the physical disk IDs included in the record of the volume group in which the above-described same physical disk is included is added to the volume group management table 2230 (step S8610).

Furthermore, the record of the volume group in which the above-described same physical disk is included is deleted from the volume group management table 2230. Thereafter, the process returns to the processing (step S8010) to confirm whether there is an unprocessed record in the volume management table 2210.

The above is an explanation of the processing to create the volume group in the storage area allocation program 2120.

Returning to FIG. 7, the storage area allocation program 2120 allocates a priority physical disk to a volume group (step S7020).

Figure 9:
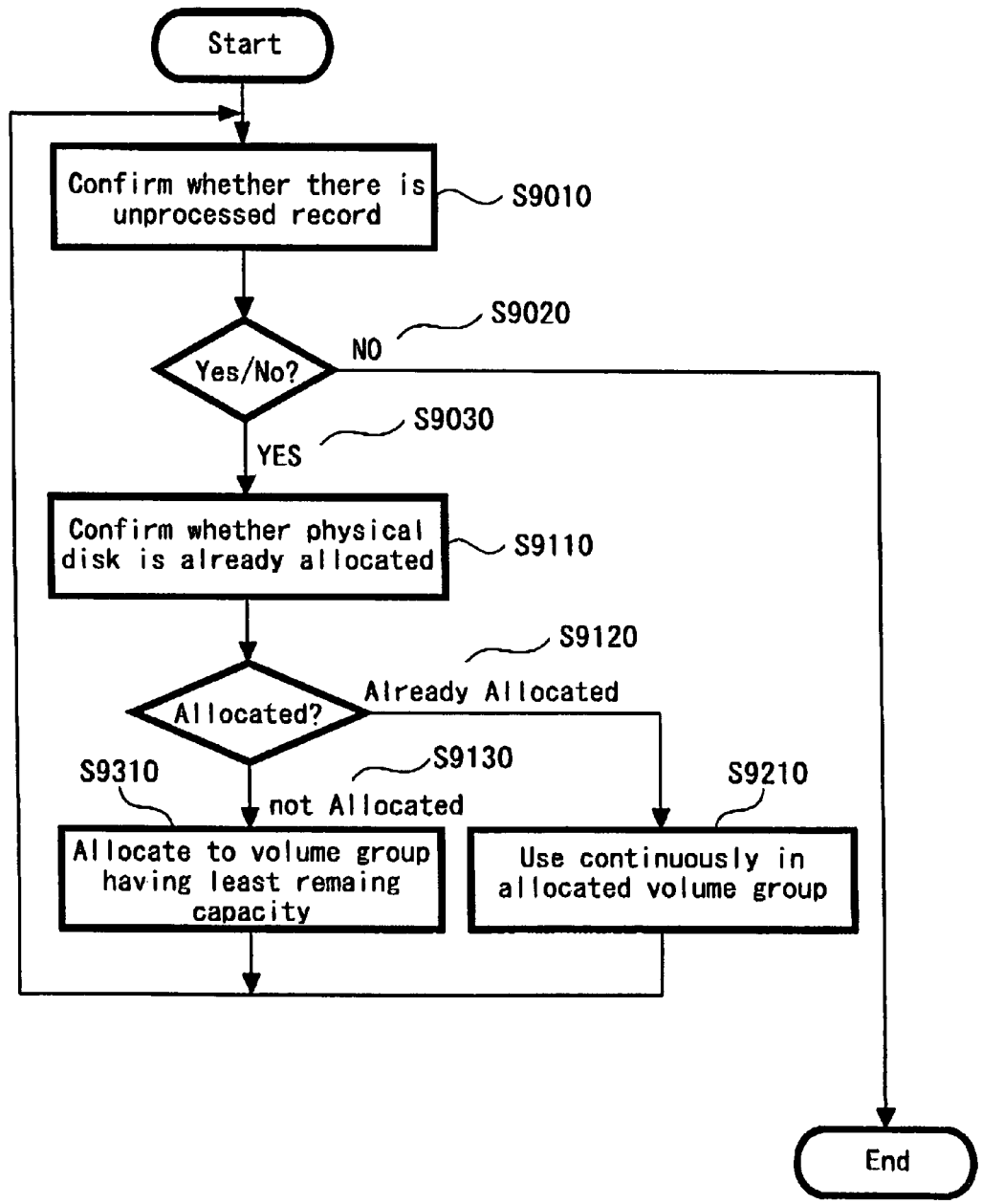
FIG. 9 is a flow chart showing processing to allocate a priority physical disk to a volume group by the storage area allocation program of the volume management server.

FIG. 9 is a flow chart showing an outline of the processing (step S7020) to allocate the priority physical disk to the volume group in the storage area allocation program 2120.

The storage area allocation program 2120 first confirms whether the processing is performed to all the records that are included in the physical disk management table 2220 (step S9010).

When the processing is completed to all the records that are included in the physical disk management table 2220 (step S9020), the storage area allocation program 2120 ends the processing to allocate the priority physical disk to the volume group.

When it is judged that there is an unprocessed record among the records included in the physical disk management table 2220 (step S9030), the storage area allocation program 2120 executes following processing to the record included in the physical disk management table 2220.

First, the storage area allocation program 2120 confirms whether the physical disk of this record of the physical disk management table 2220 is allocated to a volume group by using the allocation volume group ID of this record of the physical disk management table 2220 (step S9110).

When it is judged that the physical disk of this record of the physical disk management table 2220 is already allocated to the volume group (step S9120), no change is performed (step S9210) since this physical disk is used continuously by this volume group, and the process returns to the processing (step S9010) to confirm whether the processing is performed to all the records included in the physical disk management table 2220.

When it is judged that the physical disk of this record of the physical disk management table 2220 is not allocated to a volume group (step S9130), this physical disk is allocated to a volume group having the least remaining capacity (step S9310), and the process returns to the processing (step S9010) to confirm whether the processing is performed to all the records included in the physical disk management table 2220.

At this time, the following can be considered as a method of searching for the volume group having the least remaining capacity.

The storage area allocation program 2120 can calculate the remaining capacity of the volume group included in the volume group management table 2230 to each record of the volume group management table 2230 by acquiring the remaining capacity of the record having the identical physical disk ID from the physical disk management table 2220.

A volume group whose remaining capacity is the least in the above calculation is the volume group having the least remaining capacity among the records having the identical physical disk ID.

The above is an explanation of the processing in which the priority physical disk is allocated to the volume group in the storage area allocation program 2120.

Returning to FIG. 7, the storage area allocation program 2120 allocates the priority allocation storage area to the logical volume at the end (step S7030).

Figure 10:
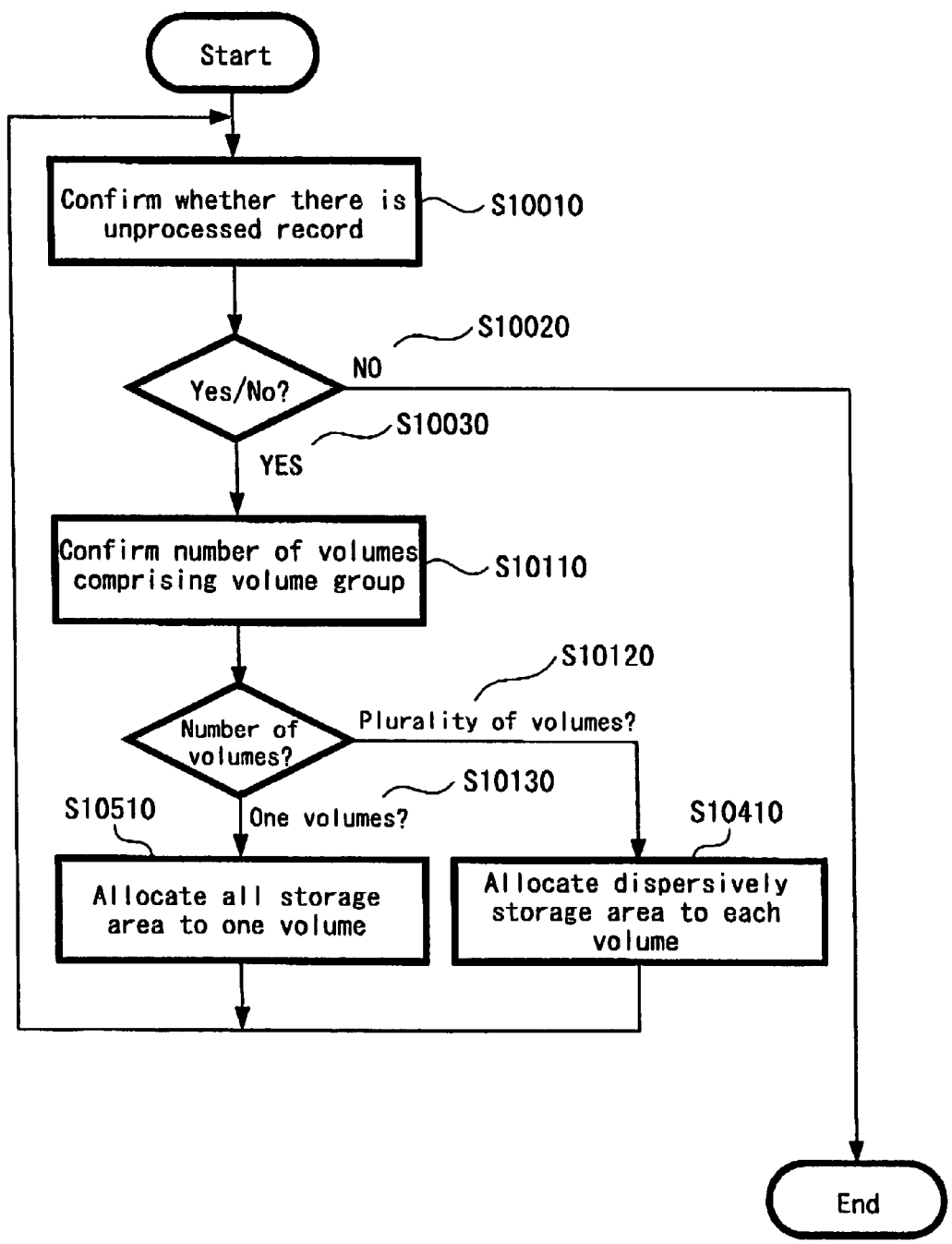
FIG. 10 is a flow chart showing processing to allocate a priority allocation storage area to a logical volume by the storage area allocation program of the volume management server.

FIG. 10 is a flow chart showing an outline of the processing (step S7030) to allocate the priority allocation storage area to the logical volume in the storage area allocation program 2120.

The storage area allocation program 2120 first confirms whether the processing is performed to all the records included in the volume management table 2210 (step S10010). When the processing is completed to all the records included in the volume management table 2210 (step S10020), the storage area allocation program 2120 ends the processing to allocate the priority allocation storage area to the logical volume.

When it is judged that there is an unprocessed record among the records included in the volume management table 2210 (step S10030), a record whose volume group ID is identical with the volume group ID of this record is searched from the volume group management table 2230, and it is confirmed whether a plurality of volume IDs are included in a value of the volume ID of the above-described record having the identical volume group ID (step S10110).

When it is judged that the plurality of volume IDs are included in the value of the volume group ID of the above-described record having the identical volume group ID (step S10120), an unallocated storage area among storage areas that are included in a physical disk allocated to this volume group is allocated evenly to a logical volume comprising this volume group as a priority allocation storage area, and a storage area ID of the above-described allocated storage area is added to the priority allocation storage area ID of this record of the volume management table 2210 (step S10410).

Then, the process returns to the processing (step S10010) to confirm whether the processing is performed to all the records included in the volume management table 2210.

When it is judged that only one volume ID is included in the volume group ID of the above-described record having the identical volume group ID (step S10130), an unallocated storage area among storage areas that are included in a physical disk allocated to this volume group is allocated as a priority allocation storage area of the above-described one volume ID, and a storage area ID of the above-described allocated storage area is added to the priority allocation storage area ID of this record of the volume management table 2210 (step S10510).

Then, the process returns to the processing (step S10010) to confirm whether the processing is performed to all the records included in the volume management table 2210.

The above is an explanation of the processing to allocate the priority allocation storage area to the logical volume in the storage area allocation program 2120.

Next, a table generated by the storage area allocation program 2120 is explained.

Figures 17, 18:
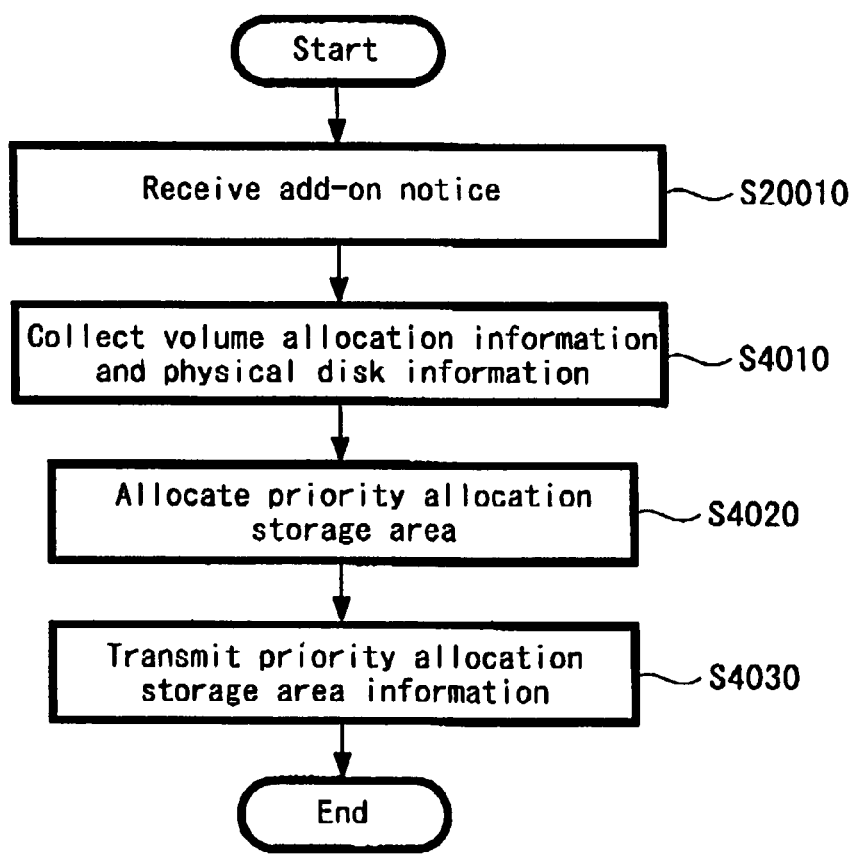
FIG. 17 is a diagram showing priority allocation storage area information that is transmitted from the volume allocation server to the storage device.
FIG. 18 is a flow chart showing another processing in the volume management server.

Priority allocation storage area information 17000 shown in FIG. 17 is comprised of a volume ID 17010 and a priority allocation storage area ID 17020.

Returning to FIG. 4, the volume management server 1010 transmits the priority allocation storage area information 17000 shown in FIG. 17 at the end to the storage device 1020 by using the information transmission program 2130 (step S4030).

More precisely, the information transmission program 2130 of the volume management server 1010 makes the CPU 2010 materialize an information transmission module so that transmission processing is executed by the information transmission program 2130.

The information transmission program 2130 creates the priority allocation storage area information 17000 from the volume ID and priority allocation storage area ID that are included in the volume management table 2210, and transmits this information to the storage device 1020.

Next, the volume management server 1010 uses the output device 2050 to notify the administrator 1060 that the setting of the priority allocation storage area is completed.

The above is an explanation of the operation of the volume management server 1010 in the present invention.

According to the present embodiment, an automatic allocation of a storage area on a physical disk to a logical volume, which is equivalent to prior-art mapping of a physical disk to a logical volume, becomes possible even in the storage device 1020 that performs the automatic expansion of a logical volume, and it is possible to expand automatically a logical volume while maintaining the I/O performance of the logical volume.

Hereinafter, another embodiment is explained by using the accompanied drawings.

In another embodiment, a point where an add-on notice reception program is retained in a hard disk 2030 of a volume management server 18010 in the configuration of the previous embodiment shown in FIG. 2 is a different point from the aforementioned embodiment.

In addition, when a physical disk is added, the storage device 1020 transmits an add-on notice to notify the addition of the physical disk to the volume management server 18010 that is set beforehand.

Hereinafter, an operation of the volume management server 18010 in another embodiment is explained.

FIG. 18 is a flow chart showing an outline of processing of the volume management server 18010 in another embodiment.

First, the volume management server 18010 waits that an add-on notice is notified from the storage device 1020 by an add-on notice reception program 19110.

When the transmitted add-on notice is received by the storage device 1020, the add-on notice reception program 19110 commands the information collection program 2110 to collect volume allocation information and physical volume information (step S20010).

Nest, the volume management server 18010 collects the volume allocation information and physical disk information from the storage device 1020 by the information collection program 2110 (step S4010). Processing performed in the information collection program 2110 is similar to the previous embodiment.

Next, the volume management server 18010 allocates a priority allocation storage area by the storage area allocation program 2120 (step S4020). Processing performed in the storage area allocation program 2120 is similar to the previous embodiment.

Next, the volume management server 18010 transmits the priority allocation storage area information 17000 shown in FIG. 17 to the storage device 1020 by the information transmission program 2130 (step S4030). Processing performed in the information transmission program 2130 is similar to the previous embodiment.

It should be noted that the add-on notice transmitted from the storage device 1020 to the volume management server 16010 is executed by using a trap module, for example. The trap module carries out a notification of start, stop, and state change such as port information, for example.

In addition, the add-on notice may be notified regularly or at arbitrary timing during an I/O decrease by an administrator.

Here, when the I/O decrease occurs, the above-described priority allocation is performed after executing a volume migration once and optimizing a system so that the volume migration becomes unnecessary thereafter.

The above is an explanation of the operation of the volume management server 18010 in another embodiment.

According to the present embodiment, an allocation of a storage area on a physical disk to a logical volume, which is equivalent to the prior-art mapping of a physical disk to a logical volume, becomes possible without an intervention of an administrator even in the storage device 1020 that performs the automatic expansion of a logical volume, and it is possible to expand automatically a logical volume while maintaining the I/O performance of the logical volume.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A computer system comprising:
   a plurality of host computers;
   a plurality of storage systems including a plurality of physical disks; and
   a management computer, wherein said management computer comprises a processor, and
   wherein said processor executes:
      an information collection program to acquire volume allocation information which indicates a relation between a plurality of logical volumes provided to said plurality of host computers and storage areas in said plurality of physical disks and physical disk information which indicates a relation between said storage areas and said plurality of physical disks of said storage system; and
      a storage area allocation program,
      wherein said storage allocation program creates a plurality of volume groups, each including one or more logical volumes in said plurality of logical volumes,
      wherein said storage allocation program sets a first physical disk in said plurality of physical disks to a first volume group in said plurality of volume groups as a priority physical disk for allocation, the first volume group including a plurality of first logical volumes of said plurality of logical volumes and having a least remaining capacity among said plurality of volume groups, wherein said storage allocation program sets a plurality of first storage areas included in said first physical disk to each of said plurality of first logical volumes included in said first volume group as priority allocation storage areas, such that storage areas of said first physical disk are only allocated to logical volumes included in said first volume group, and wherein, when the processor receives a request for writing to one of said plurality of first logical volumes, the processor confirms whether a storage area is allocated to said one of said plurality of first logical volumes, and if a storage area is not allocated to said one of said plurality of first logical volumes, said storage allocation program allocates a storage area of said priority allocation storage areas to said one of said plurality of first logical volumes, and write data corresponding to said request to said allocated storage area, and wherein said storage area allocation program creates each of said plurality of volume groups by grouping together logical volumes that share a physical disk based on said volume allocation information and said physical disk information, and wherein said storage allocation program confirms whether a second disk drive in said plurality of disk drives is allocated to each of a plurality of second volume groups in said plurality of volume groups as a priority physical disk, and wherein if said second disk drive is allocated to each of said plurality of second volume groups as a priority physical disk, said storage allocation program integrates a plurality of second volume groups into a new volume group.

2. A computer system according to claim 1, wherein said storage area allocation program gives an identical volume group ID to each of the plurality of volume groups allocated to an identical physical disk.

3. A storage area allocation method implemented in a computer system, wherein said computer system includes a plurality of host computers, a plurality of storage systems including a plurality of physical disks, and a management computer, and wherein said management computer operates to perform steps of said storage area allocation method, said method comprising:

acquiring volume allocation information which indicates a relation between a plurality of logical volumes provided to said plurality of host computers and storage areas in said plurality of physical disks and physical disk information which indicates a relation between said storage areas and said plurality of physical disks of said storage system by using an information collection program; and creating, by a storage allocation program, a plurality of volume groups, each including one or more logical volumes in said plurality of logical volumes;

setting, by said storage allocation program, a first physical disk in said plurality of physical disks to a first volume group in said plurality of volume groups as a priority physical disk for allocation, the first volume group including a plurality of first logical volumes of said plurality of logical volumes and having a least remaining capacity among said plurality of volume groups; and setting, by said storage allocation program, a plurality of first storage areas included in said first physical disk to each of said plurality of first logical volumes included in said first volume group as priority allocation storage areas, such that storage areas of said first physical disk are only allocated to logical volumes included in said first volume group, wherein, when the processor receives a request for writing to one of said plurality of first logical volumes, the processor confirms whether a storage area is allocated to said one of said plurality of first logical volumes, and if a storage area is not allocated to said one of said plurality of first logical volumes, said storage allocation program allocates a storage area of said priority allocation storage areas to said one of said plurality of first logical volumes, and write data corresponding to said request to said allocated storage area, wherein said storage area allocation program creates each of said plurality of volume groups by grouping together logical volumes that share a physical disk based on said volume allocation information and said physical disk information, and wherein said storage allocation program confirms whether a second disk drive in said plurality of disk drives is allocated to each of a plurality of second volume groups in said plurality of volume groups as a priority physical disk, and wherein if said second disk drive is allocated to each of said plurality of second volume groups as a priority physical disk, said storage allocation program integrates a plurality of second volume groups into a new volume group.

4. A storage area allocation method according to claim 3, wherein said storage area allocation program creates each of said plurality of volume groups by grouping together logical volumes that share a physical disk based on said volume allocation information and said physical disk information.

5. A storage area allocation method according to claim 3, wherein said storage area allocation program gives an identical volume group ID to each of the plurality of volume groups allocated to an identical physical disk.

6. A management computer that controls a plurality of storage systems including a plurality of physical disks that store data used by a plurality of host computers on a plurality of volumes, the management computer comprising:

a memory;

a hard disk;

a processor that performs control;

an input device that gives said storage system a command to set a priority allocation storage area;

an output device that notifies a completion of setting the priority allocation storage area from said storage system; and a communication port that performs communication of management data with said storage system, wherein said hard disk comprises a management table that is generated based on volume allocation information and physical disk information which are retained in said storage system;

an information collection program that collects information from said storage system;

a storage area allocation program that allocates a storage area of a physical disk to a logical volume of said storage system; and an information transmission program that transmits storage area allocation information of said allocation to said storage system, wherein the control is performed such that said information collection program acquires volume allocation which indicates a relation between a plurality of logical volumes provided to said plurality of host computers and storage areas in said plurality of physical disks and physical disk information which indicates a relation between said storage areas and said plurality of physical disks of said storage system, wherein said storage allocation program creates a plurality of volume groups, each including one or more logical volumes in said plurality of logical volumes, wherein said storage allocation program sets a first physical disk in said plurality of physical disks to a first volume group in said plurality of volume groups as a priority physical disk for allocation, the first volume group including a plurality of first logical volumes of said plurality of logical volumes and having a least remaining capacity among said plurality of volume groups, wherein said storage allocation program sets a plurality of first storage areas included in said first physical disk to each of said plurality of first logical volumes included in said first volume group as priority allocation storage areas, such that storage areas of said first physical disk are only allocated to logical volumes included in said first volume group, and wherein, when the processor receives a request for writing to one of said plurality of first logical volumes, the processor confirms whether a storage area is allocated to said one of said plurality of first logical volumes, and if a storage area is not allocated to said one of said plurality of first logical volumes, said storage allocation program allocates a storage area of said priority allocation storage areas to said one of said plurality of first logical volumes, and write data corresponding to said request to said allocated storage area, wherein said storage area allocation program creates each of said plurality of volume groups by grouping together logical volumes that share a physical disk based on said volume allocation information and said physical disk information, and wherein said storage allocation program confirms whether a second disk drive in said plurality of disk drives is allocated to each of a plurality of second volume groups in said plurality of volume groups as a priority physical disk, and wherein if said second disk drive is allocated to each of said plurality of second volume groups as a priority physical disk, said storage allocation program integrates a plurality of second volume groups into a new volume group.

7. A management computer according to claim 6, wherein said storage area allocation program gives an identical volume group ID to each of the plurality of volume groups allocated to an identical physical disk.

* * * * *